(12) United States Patent
Carroni et al.

(10) Patent No.: US 9,719,377 B2
(45) Date of Patent: Aug. 1, 2017

(54) OPERATION OF GAS TURBINE POWER PLANT WITH CARBON DIOXIDE SEPARATION

(71) Applicant: ALSTOM Technology Ltd, Baden (CH)

(72) Inventors: Richard Carroni, Niederrohrdorf (CH); Jürgen Hoffmann, Untersiggenthal (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 286 days.

(21) Appl. No.: 14/444,253

(22) Filed: Jul. 28, 2014

(65) Prior Publication Data

US 2015/0047366 A1 Feb. 19, 2015

(30) Foreign Application Priority Data

Aug. 15, 2013 (EP) .................................... 13180602

(51) Int. Cl.
*F01K 23/10* (2006.01)
*F01D 25/30* (2006.01)
*F02C 6/04* (2006.01)

(52) U.S. Cl.
CPC ............ *F01D 25/30* (2013.01); *F01K 23/101* (2013.01); *F02C 6/04* (2013.01); *F05D 2260/61* (2013.01);
(Continued)

(58) Field of Classification Search
CPC .......... F01D 25/30; F01K 23/101; F02C 6/04; F05D 2260/61; F05D 2260/611; Y02C 10/00; Y02C 10/06
(Continued)

(56) References Cited

U.S. PATENT DOCUMENTS

| 4,207,864 A | 6/1980 | Fischer et al. |
| 6,256,976 B1 * | 7/2001 | Kataoka ................. F02C 3/305 60/39.52 |

(Continued)

FOREIGN PATENT DOCUMENTS

| CN | 1487181 A | 4/2004 |
| CN | 1771385 A | 5/2006 |

(Continued)

OTHER PUBLICATIONS

Office Action (Notification of Reasons for Refusal) issued on Jul. 21, 2015, by the Japanese Patent Office in corresponding Japanese Patent Application No. 2014-165469, and an English Translation of the Office Action. (7 pages).

(Continued)

*Primary Examiner* — Steven Sutherland
(74) *Attorney, Agent, or Firm* — Buchanan Ingersoll & Rooney PC

(57) ABSTRACT

The invention relates to a method for operating a gas turbine power plant, including a gas turbine, a HRSG following the gas turbine, an exhaust gas blower, and a carbon dioxide separation plant which separates the carbon dioxide contained in the exhaust gases and discharges it to a carbon dioxide outlet, the gas turbine, HRSG, exhaust gas blower, and carbon dioxide separation plant being connected by means of exhaust gas lines. According to the method a trip of the gas turbine power plant includes the steps of: stopping the fuel supply, switching off the exhaust gas blower, and controlling the opening angle of a VIGV at a position bigger or equal to a position required to keep a pressure in the exhaust gas lines between the HRSG and the exhaust gas blower above a minimum required pressure. The invention relates, further relates to a gas turbine power plant configured to carry out such a method.

13 Claims, 4 Drawing Sheets

(52) U.S. Cl.
CPC .... *F05D 2260/611* (2013.01); *F05D 2270/08* (2013.01); *F05D 2270/3013* (2013.01); *Y02C 10/06* (2013.01); *Y02E 20/16* (2013.01); *Y02E 20/326* (2013.01)

(58) Field of Classification Search
USPC ...................................................... 60/39.182
See application file for complete search history.

(56) References Cited

U.S. PATENT DOCUMENTS

| | | |
|---|---|---|
| 6,907,722 B2 | 6/2005 | Tanaka |
| 7,293,415 B2 | 11/2007 | Hoffmann et al. |
| 8,408,006 B2 | 4/2013 | Li et al. |
| 2004/0045275 A1 | 3/2004 | Tanaka |
| 2006/0010876 A1 | 1/2006 | Hoffmann et al. |
| 2011/0302922 A1 | 12/2011 | Li et al. |
| 2012/0186268 A1 | 7/2012 | Rofka et al. |
| 2012/0240591 A1 | 9/2012 | Snider et al. |

FOREIGN PATENT DOCUMENTS

| | | |
|---|---|---|
| CN | 102265004 A | 11/2011 |
| DE | 3915478 A1 | 11/1989 |
| DE | 10 2011 102 720 A1 | 12/2011 |
| EP | 2 067 941 A2 | 6/2009 |
| EP | 2 503 106 A1 | 9/2012 |
| JP | 2003-148173 A | 5/2003 |
| JP | 2010-025069 A | 2/2010 |
| JP | 2012-514151 A | 6/2012 |
| JP | 2012-154330 A | 8/2012 |
| WO | 2010/072710 A2 | 7/2010 |
| WO | 2010/072729 A2 | 7/2010 |
| WO | 2011/039072 A2 | 4/2011 |
| WO | 2013/083620 A1 | 6/2013 |

OTHER PUBLICATIONS

Office Action issued on Sep. 28, 2015, by the State Intellectual Property Office, P.R. China in corresponding Chinese Patent Application No. 201410401762.2, and an English translation of the Office Action. (20 pages).

* cited by examiner

OPERATION OF GAS TURBINE POWER PLANT WITH CARBON DIOXIDE SEPARATION

CROSS-REFERENCE TO RELATED APPLICATIONS

This application claims priority to European application 13180602.8 filed Aug. 15, 2013, the contents of which are hereby incorporated in its entirety.

TECHNICAL FIELD

The present invention relates to a method for operating a gas turbine power plant with carbon dioxide separation from the exhaust gases.

BACKGROUND

Carbon dioxide emissions as greenhouse gases contributing appreciably to global warming are known. In order to reduce the carbon dioxide emissions of gas turbine power plants in order thereby to prevent global warming, various arrangements and methods have been proposed. The most technically advanced methods seem to be those in which carbon dioxide is separated from the exhaust gas stream of the power plant by absorption or adsorption. Typically, the useful waste heat from a gas turbine is used further in a profitable way for energy recovery in a HRSG. The exhaust gases are thereby cooled, but usually do not yet reach the temperature level necessary for absorption or adsorption, and therefore they are typically cooled further in a re-cooler before they are introduced into a carbon dioxide separation plant. In this, carbon dioxide is separated from the exhaust gases and discharged for further use. The carbon dioxide lean exhaust gases are discharged into the environment via a chimney. A plant of this type is known, for example, from WO2011/039072.

Further, the use of a blower for overcoming the pressure loss of the carbon dioxide separation plant is known from EP2067941.

However, the use of a blower for overcoming the pressure loss of the carbon dioxide separation plant is not without its problems. A blower of this type has to convey large volume flows and has correspondingly large dimensioning and high inertia.

SUMMARY

In the event of rapid changes in the operating conditions of the gas turbine, which lead to major changes in the exhaust gas volume flow within a short time, the blower cannot follow the rapid transients without additional measures. Particularly in the event of an emergency shutdown (trip) of the gas turbine, the exhaust gas volume flow falls significantly within a few seconds as a result of the rapid closing of the compressor inlet guide vanes and a reduction in the exhaust gas temperature. During an emergency shutdown, the exhaust gas volume flow may fall to 50% or less of the full-load exhaust gas flow within 5 to 10 seconds. Conventionally the compressor inlet guide vanes are closed immediately after a trip signal has been received to avoid compressor instabilities, in particular a compressor stall, during run-down of the gas turbine.

A typical exhaust gas blower has no adjustable guide vanes, and because of its high inertia it runs down slowly, even when its drive is switched off immediately, and still conveys a volume flow which is markedly above the reduced exhaust gas flow of the gas turbine. As a result of this difference is the volume flows, a dangerous vacuum or under-pressure relative to the surrounding ambient air (negative gauge pressure) may be generated in the HRSG and the exhaust gas lines and in the worst case may lead to an implosion of the HRSG and exhaust gas lines.

One aim of the present disclosure is to specify a method for operating a gas turbine power plant with carbon dioxide separation from the exhaust gases, in which, even in the event of a trip, no hazardous pressure differences inherently arises between the exhaust gas side in the HRSG or the exhaust gas ducts and the surroundings. In addition to the method a gas turbine power plant configured for operating according to such a method is the subject of the disclosure.

A gas turbine power plant with carbon dioxide separation comprises a gas turbine, a HRSG (heat recovery steam generator or boiler) following the gas turbine, an exhaust gas blower, a carbon dioxide separation plant which separates the carbon dioxide contained in the exhaust gases from these and discharges it to a carbon dioxide outlet. Typically it also comprises a chimney.

Further, an exhaust gas re-cooler can be arranged between the HRSG and exhaust gas blower. The gas turbine, HRSG, exhaust gas re-cooler, exhaust gas blower, carbon dioxide separation plant and chimney are connected by means of exhaust gas lines or exhaust gas ducts. The exhaust gas blower is typically arranged downstream of the exhaust gas re-cooler, since the blower then has to convey a lower volume flow and is also exposed to lower temperatures.

The disclosed method for operating a gas turbine power plant with a carbon dioxide separation plant comprises the following steps during a trip of the plant: stopping the fuel supply to the gas turbine, switching off the exhaust gas blower, and controlling the opening angle of a VIGV at a position bigger or equal to a position required to keep a pressure in the exhaust gas lines between the HRSG and the exhaust gas blower above a minimum required pressure. The proposed operating concept is possible because it has been found that a compressor stall does not occur until the turbine speed is reduced to below 70% or even below 50% of the design operating speed of the gas turbine.

The minimum required pressure is the pressure required to assure that the HRSG and exhaust gas ducts do not implode, collapse or break due to the ambient pressure of the surrounding air. Typically a HRSG and exhaust gas ducts are designed for a slight overpressure inside the exhaust gas ducts and HRSG relative to the ambient surroundings to allow flow of the exhaust gas through the HRSG and release to the environment via a chimney. The large surface areas of the HRSG and exhaust gas ducts are not designed for a reversal of this pressure difference. The allowable minimum required pressure can be the ambient pressure, or can for example be in the order of 10 to 50 mbar below the ambient pressure. Because the load on the large surface areas of the HRSG and exhaust gas ducts depends on the pressure difference to the ambient surroundings the minimum pressure is defined as a gauge pressure (or pressure difference from the exhaust gas side to the ambient surrounding).

According to one embodiment of the method for operating a gas turbine power plant the opening angle of the VIGV is controlled as a function of the pressure (preferably gauge pressure, respectively pressure difference to the pressure of the surrounding ambient air) in the exhaust gas lines between the HRSG and the exhaust gas blower.

According to one specific embodiment the VIGV is opened if the gauge pressure decreases, and the VIGV is closed if the gauge pressure increases. More specifically the VIGV position can be inverse proportional to the gauge pressure. According to another specific embodiment the VIGV remains unchanged until a first limit value in the pressure in the exhaust gas lines between the HRSG and the exhaust gas blower is exceeded. Once this limit value is exceeded the VIGV starts to close. In addition a second limit value can be defined and the VIGV opens if the second limit value is exceeded. The first limit value typically is a positive gauge pressure and the second limit value a negative gauge pressure.

According to another more specific embodiment of the method the opening angle of the VIGV is controlled as a function of the pressure in the exhaust gas lines between the exhaust gas re-cooler and the exhaust gas blower.

According to a further version of the method for operating a gas turbine power plant the opening angle of the VIGV is kept unchanged at the position when a trip signal was received at a trip initiation time until a first delay time is reached. By keeping the VIGV at the unchanged position it can be assured that the exhaust mass flow of the gas turbine stays high for a sufficient time until the flow of the exhaust gas blower is reduced to a safe level.

According to another version of the method for operating a gas turbine power plant the opening angle of the VIGV is increased to a VIGV open position when a trip signal was received at a trip initiation time. By opening the VIGV the exhaust mass flow of the gas turbine stays high for a sufficient time until the flow of the exhaust gas blower is reduced to a safe level.

In a further version of the method for operating a gas turbine power plant the opening angle of the VIGV is kept unchanged at the position when a trip signal was received at a trip initiation time until a first delay time is reached and the VIGV is closed to a VIGV closed position in the time span between the first delay time and a VIGV closed time.

In a further version of the method for operating a gas turbine power plant a power supply to the VIGV is deactivated when a third delay time is reached. The power supply of the VIGV typically is a power oil supply to hydraulically drive a VIGV actuator. If the gas turbine power plant is shut down due to a trip (emergency shut-down of the plant), i.e. because a failure has been detected which endangers the safe operation of the gas turbine all potentially hazardous systems should be deactivated as soon as possible. Hydraulic power oil can become hazardous if it leaks due to for example a mechanical damage and oil comes to contact with hot parts of the gas turbine parts. Therefore power oil systems are typically switched off during a trip. The choice of a third delay time to switch of the power oil systems allows a control of the VIGV position and ensures a switch off of the system after a short time before potentially dangerous quantities of power oil could be lost due to an oil leak.

In another embodiment the power supply to the VIGV is deactivated once the VIGV reaches the VIGV closed position.

In yet another embodiment of the method for operating a gas turbine power plant the cooling air re-cooler is switched off after the trip is initiated. This leads to increased exhaust gas temperature at the exhaust gas blower and therefore to an increased volume flow at the exhaust gas blower and consequently to reduced mismatch between the gas turbine exhaust gas volume flow and the exhaust gas blower's flow rate during shut down.

According to another embodiment of the method for operating a gas turbine power plant the opening angle of the VIGV is initially kept at opening angle bigger or equal to opening angle of the VIGV at the time when a trip signal was received. The VIGV is kept at such a position until the speed of the gas turbine is reduced to a speed limit for closing the VIGV. The speed limit for closing the VIGV is above the speed at which compressor instabilities might occur during a run down, in particular it is higher than the speed at which a compressor stall might occur. The difference between the speed limit for closing the VIGV and the speed at which a stall might occur should be sufficient to allow closing of the VIGV in the time it takes the gas turbine to run down from the speed limit closing the VIGV to the speed at which a stall might occur.

In a further embodiment of the method for operating a gas turbine power plant the opening angle of the VIGV can also be increased to a VIGV open position when a trip signal was received and kept at the VIGV open position until the speed limit for closing the VIGV is reached.

In addition to the method a gas turbine power plant comprising a gas turbine, a HRSG following the gas turbine, an exhaust gas blower, and a carbon dioxide separation plant, which separates the carbon dioxide contained in the exhaust gases from these and discharges it to a carbon dioxide outlet, is also the subject of the disclosure. In the power plant the gas turbine, HRSG, exhaust gas blower, and the carbon dioxide separation plant are fluidly connected by means of exhaust gas lines. According to the disclosure the plant comprises a controller, which is configured to control the opening angle of a VIGV at a position bigger or equal to a position required to keep a pressure in the exhaust gas lines between the HRSG and the exhaust gas blower above a minimum required pressure during a trip of the gas turbine power plant.

According to one embodiment such a gas turbine power plant comprises a HRSG exit pressure measurement and/or an exhaust gas blower inlet pressure measurement. Such a measurement can be arranged in the outlet of the HRSG, respectively in the inlet of the exhaust gas blower or can be arranged in the exhaust gas lines.

In further embodiment the gas turbine power plant the controller is configured to opening the VIGV as a function of the pressure measured by HRSG exit pressure measurement and/or an exhaust gas blower inlet pressure measurement.

All the advantages explained can be used not only in the combinations specified in each case, but also in other combinations or alone, without departing from the scope of the invention.

BRIEF DESCRIPTION OF THE DRAWINGS

Preferred embodiments of the invention are described below by means of the drawings which serve merely for explanatory purposes and are not to be interpreted restrictively. In the drawings, for example.

DETAILED DESCRIPTION

Figure 1:
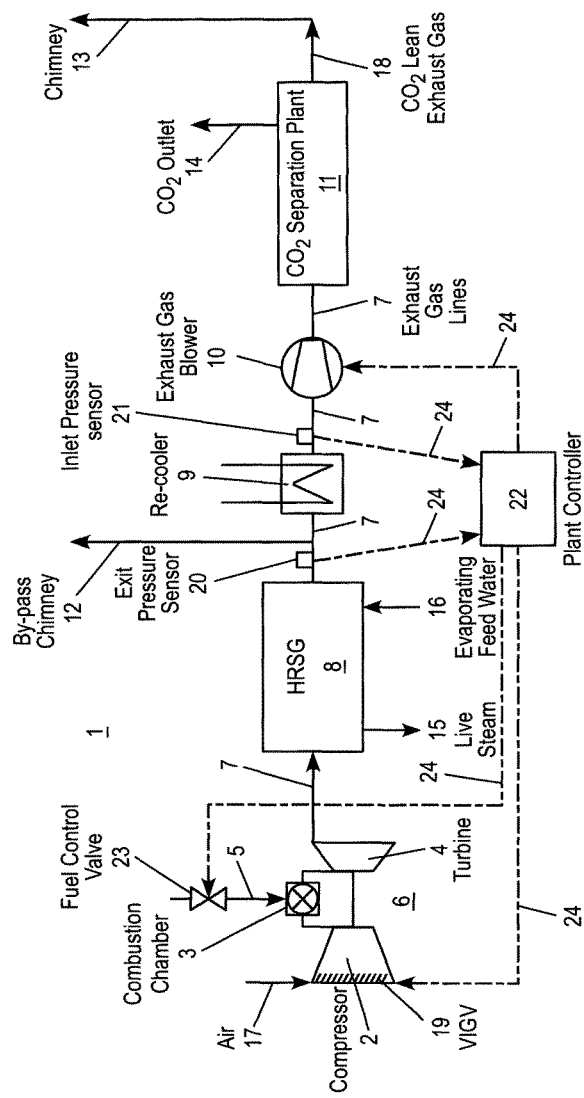
FIG. 1 shows a schematic illustration of a gas turbine power plant with an exhaust gas blower.

FIG. 1 shows a schematic illustration of the main elements of a gas turbine power plant according to an exemplary embodiment. The gas turbine 6 comprises a compressor 2; the combustion air compressed therein being delivered to a combustion chamber 3 and being burnt there with fuel 5. The hot combustion gases are subsequently expanded in a turbine 4. The useful energy generated in the gas turbine 6 is then converted into electrical energy, for example, by means of a generator (not illustrated) arranged on the same shaft.

The hot exhaust gases emerging from the turbine 4 are conducted through an exhaust gas line 7 for the optimal utilization of the energy still contained in them to a HRSG 8 (Heat Recovery Steam Generator, or in a waste heat boiler) and are used for evaporating feed water 16 and for generating live steam 15 for a steam turbine (not illustrated) or for other plants. The steam circuit is indicated merely schematically by the HRSG 8. The steam turbine, condenser, various pressure stages, feed water pumps, etc. are not shown since these are not the subject of the invention.

The exhaust gases from the HRSG 8 are conducted further on, downstream of the HRSG 8, through the exhaust gas line 7 in an exhaust gas re-cooler 9. In this exhaust gas re-cooler 9, which may be equipped with a condenser, the exhaust gases are cooled to somewhat (typically 5° C. to 20° C.) above ambient temperature. Downstream of this exhaust gas re-cooler 9, in the exhaust gas line 7, an exhaust gas blower 10 is arranged which is followed by a carbon dioxide separation plant 11. In this carbon dioxide separation plant 11, carbon dioxide is separated out of the exhaust gases and discharged via a carbon dioxide outlet (14). The separated carbon dioxide can then, for example, be compressed for further transport and storage.

The carbon dioxide lean exhaust gas 18, low in CO2, from the carbon dioxide separation plant 11 is discharged into the surroundings via a chimney 13. The pressure loss of the carbon dioxide separation plant 11 can be overcome by means of the exhaust gas blower 10. Depending on the design and back pressure of the gas turbine 6 or HRSG 8, moreover, the pressure loss of the re-cooler 9, of the exhaust gas lines 7, of the chimney 13 and/or of the HRSG are also at least partly overcome by means of the exhaust gas blower 10.

Upstream of the exhaust gas re-cooler 9 is arranged a bypass chimney 12 which makes it possible to operate the gas turbine and HRSG when the carbon dioxide separation plant 11 is not operative, for example for maintenance work. In normal operation, the inlet to the bypass chimney 12 is closed, so that all the exhaust gases are discharged into the surroundings through the re-cooler 9, the exhaust gas blower 10, the carbon dioxide separation plant 11 and the chimney 13. In bypass operation, the inlet into the bypass chimney 12 is opened, so that the exhaust gases can be discharged into the surroundings directly via the bypass chimney 12. To regulate the exhaust gas streams, flaps or valves may be arranged in the exhaust gas lines 7 and the bypass chimney 12. For example, a flap (not shown) may be arranged in the exhaust gas line 7 between the bypass chimney and exhaust gas re-cooler 9, in order to suppress flow into the re-cooler in the event of a shutdown of the carbon dioxide separation plant 11.

The gas turbine power plant 1 comprises a controller 22 for controlling the operation of the gas turbine, the HRSG (typically also including a water steam cycle—not shown) and the this carbon dioxide separation plant 11 including the re-cooler 9 and the exhaust gas blower 10. Typically a plant controller 22 has a hierarchical architecture with sub-controllers for the main components, e.g. one sub-controller for the gas turbine 6, one sub-controller for the water steam cycle and one controller for the carbon dioxide separation plant 11

The gas turbine 6 comprises a VIGV 19 (variable inlet guide vane) for controlling the inlet mass flow of the compressor 2. The fuel flow can be controlled by a fuel control valve 23. The exhaust gas blower 10 can be controlled to match the mass flow of the exhaust gas mass flow entering the carbon dioxide separation plant 11 with the exhaust gas mass flow leaving the gas turbine 6. Matching of the exhaust gas mass flow entering the carbon dioxide separation plant 11 with the exhaust gas mass flow leaving the gas turbine 6 leads to the correct pressure in the exhaust gas line 7. For measurement of the pressure in the exhaust gas system a HRSG exit pressure measurement 20 and an exhaust gas blower inlet pressure measurement 21 are installed along the exhaust gas flow path.

The VIGV 19 and the fuel control valve 23, respectively an actuator and/or position transmitter, are connected to the controller 22 by a control line 24. Further, the exhaust gas blower 10 is connected to the controller 22 by a control line 24, and the HRSG exit pressure measurement 20 as well as the exhaust gas blower inlet pressure measurement 21 are connected to the controller 22 by control lines 24.

Figure 2:
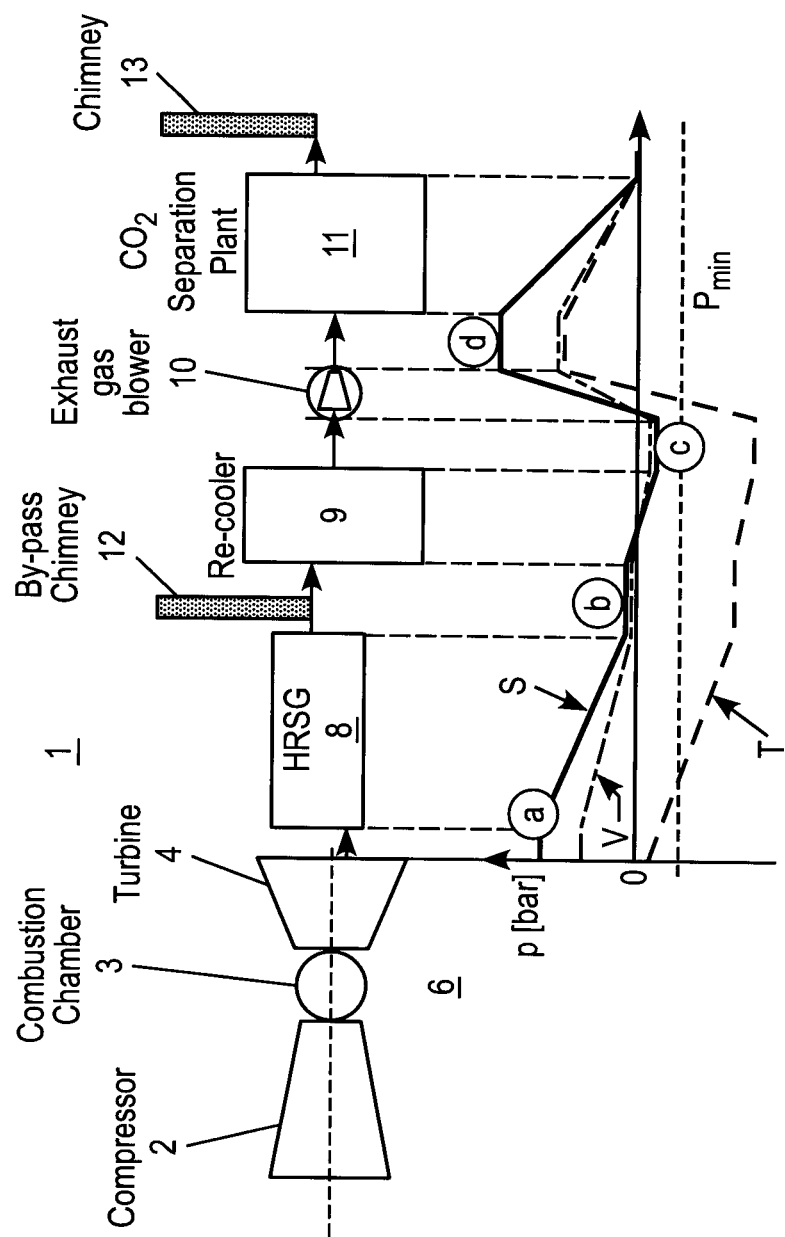
FIG. 2 shows a schematic illustration of a gas turbine power plant with an exhaust gas blower and the pressure profile in the exhaust gas lines.

FIG. 2 shows the plant from FIG. 1 in even more simplified form. In addition, the pressure profile in the exhaust gas line 7, the HRSG 8, the exhaust gas re-cooler 9, the exhaust gas blower 10 and the carbon dioxide separation plant 11 is indicated for standard operation S and for the critical operating state during conventional a trip T (emergency shutdown). The pressure profile in the exhaust gas line 7 is further shown for operation with the proposed controlled VIGV position V.

The pressure profile for standard operation S is selected in the example shown such that, between the gas turbine and the bypass chimney 12, it corresponds to the pressure profile in a conventional gas turbine combined-cycle power plant without carbon dioxide separation, that is to say the pressure at the outlet of the turbine is so high that the pressure loss of the HRSG 8 is overcome. Downstream of the HRSG 8, the pressure b is virtually identical to the ambient pressure. Downstream of the exhaust gas re-cooler 9, the pressure c falls below the ambient pressure before it is raised by the exhaust gas blower 10 to a pressure d which is sufficiently high to overcome the pressure loss of the carbon dioxide separation plant 11 and discharge the exhaust gases into the surroundings via the chimney 13. The exhaust gas blower 10 is regulated such that the pressure at the inlet of the bypass chimney 12 is virtually identical to the ambient pressure.

Starting from the pressure profile for standard operation S, the pressure in the exhaust gas tract, in the event of a trip T, falls within a few seconds, since the exhaust gas blower conveys a higher exhaust gas stream than emerges from the turbine. The pressure is below ambient pressure as early as at the outlet of the turbine. The pressure falls further due to the pressure loss of the exhaust gas lines 7, HRSG 8 and exhaust gas re-cooler 9. The under-pressure in the HRSG 8 and re-cooler 9 and also in the exhaust gas lines 7 may in this case become dangerously high. The pressure is raised again only by the exhaust gas blower 10 to an extent such that the pressure loss, reduced in proportion to the volume flow, of the carbon dioxide separation plant 11 can be overcome.

In order both to avoid a high under-pressure, a new method of controlling the VIGV 19 in case of a trip is proposed leading to a moderate pressure distribution at all times.

Figure 3:
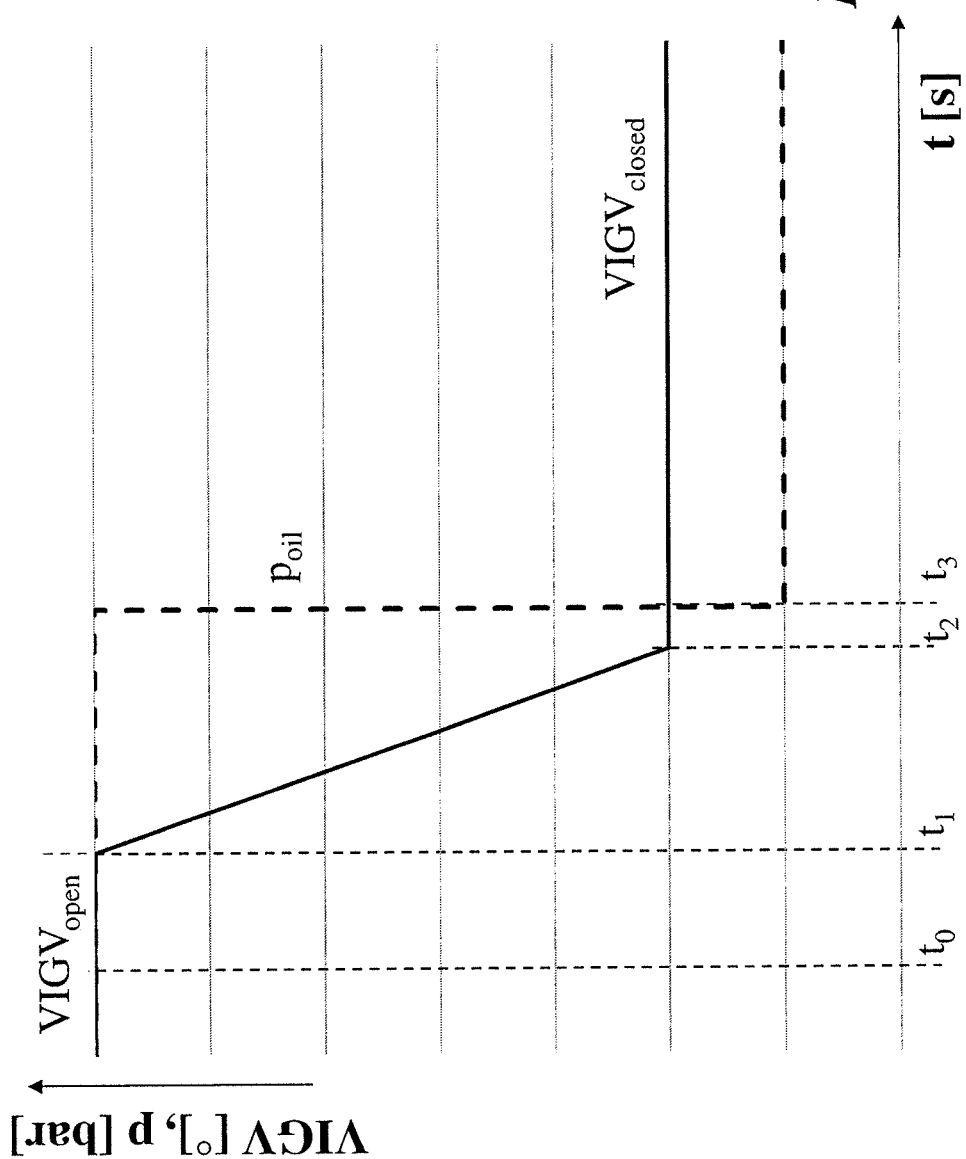
FIG. 3 shows a schematic illustration of an exemplary change of the VIGV and pressure of power oil over time during a trip.

The change of the VIGV and pressure of power oil over time during a shut-down shown according to an exemplary embodiment is shown in FIG. 3.

According to the state of the art the VIGV is closed from a $VIGV_{open}$ position to a $VIGV_{closed}$ position as fast as possible (not shown in FIG. 3) once the controller receives a trip signal or determines to trip the machine based on other measurements.

According to the proposed method and in contrast to the conventional method the VIGV is kept in the open position $VIGV_{open}$ for a first delay time $t_1$ and then closed to a VIGV closed position $VIGV_{closed}$. In this example it is closed with a constant closing speed to reach the VIGV closed position $VIGV_{closed}$ at prescribed time called VIGV closed time $t_2$. Shortly after the VIGV reaches the VIGV closed position $VIGV_{closed}$ the power oil for driving the actuators of the VIGVs is shut off at a third delay time $t_3$.

If the plant was operating at part load the VIGV does not have to be in a fully open position before the shutdown. According to this embodiment the VIGV will be kept at an unchanged position till the first delay time $t_1$ is reached.

Figure 4:
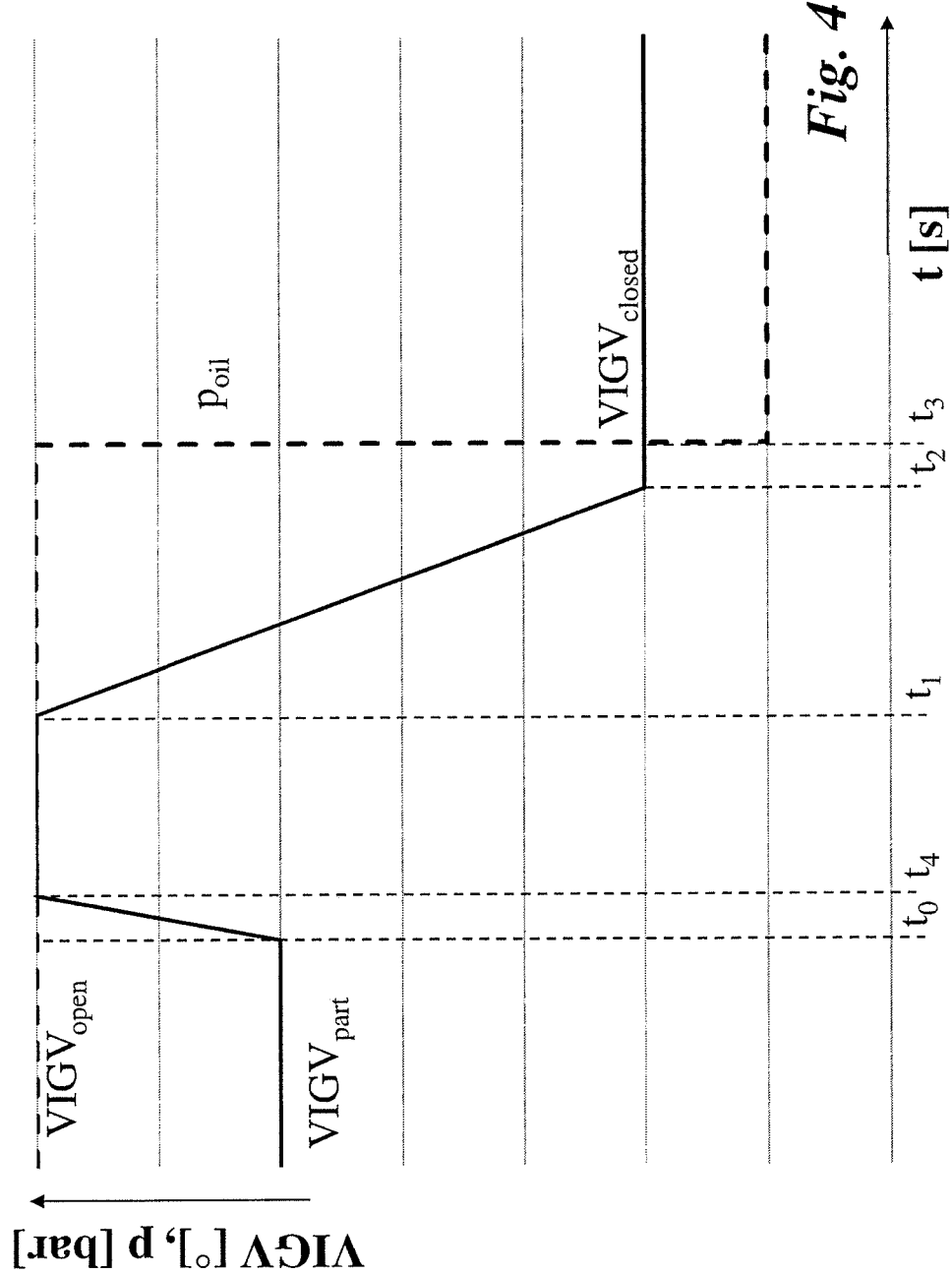
FIG. 4 shows a schematic illustration of another exemplary change of the VIGV and pressure of power oil over time during a trip.

FIG. 4 shows a schematic illustration of another exemplary change of the VIGV and pressure of power oil over time during a trip. FIG. 4 is based on FIG. 3. Here the gas turbine was operating at part load before the trip occurs. Correspondingly the VIGV is closed to a part load position $VIGV_{part}$. The method shown in FIG. 4 differs from the method of FIG. 3 in that the VIGV is opened to VIGV open position $VIGV_{open}$ between the time of the trip $t_0$ and a VIGV open time $t_4$. The VIGV open time $t_4$ can be predetermined or a function of the part load position of the VIGV before the trip and the (maximum) opening speed of the VIGV.

The invention claimed is:

1. A method for operating a gas turbine power plant in the event of an emergency shutdown, the gas turbine power plant including a gas turbine, a HRSG downstream of the gas turbine, an exhaust gas blower, and a carbon dioxide separation plant which separates carbon dioxide contained in exhaust gases and discharges separated carbon dioxide to a carbon dioxide outlet, the gas turbine, HRSG, exhaust gas blower, and carbon dioxide separation plant being connected by exhaust gas lines, the method comprising:
stopping a fuel supply, switching off the exhaust gas blower, and controlling an opening angle of a VIGV at a position larger than or equal to a position configured to keep a pressure in the exhaust gas lines between the HRSG and the exhaust gas blower above a minimum required pressure to prevent hazardous pressure differences between the exhaust gas side of the HRSG and ambient air.

2. The method for operating a gas turbine power plant according to claim 1, wherein the opening angle of the VIGV is controlled as a function of the pressure in the exhaust gas lines between the HRSG and the exhaust gas blower.

3. The method for operating a gas turbine power plant according to claim 1, wherein the opening angle of the VIGV is controlled as a function of the pressure in the exhaust gas lines between an exhaust gas re-cooler and the exhaust gas blower.

4. The method for operating a gas turbine power plant according to claim 1, wherein the opening angle of the VIGV is kept unchanged at the position when an emergency shutdown signal was received at an emergency shutdown initiation time until a first delay time is reached.

5. The method for operating a gas turbine power plant according to claim 4, wherein the VIGV is closed to a VIGV closed position until a VIGV closed time is reached.

6. The method for operating a gas turbine power plant according to claim 5, wherein a power supply to the VIGV is deactivated when a third delay time is reached.

7. The method for operating a gas turbine power plant according to claim 5, wherein a power supply to the VIGV is deactivated once the VIGV reaches the VIGV closed position.

8. The method for operating a gas turbine power plant according to claim 1, wherein the opening angle of the VIGV is increased to an VIGV open position when an emergency shutdown signal was received at an emergency shutdown initiation time.

9. The method for operating a gas turbine power plant according to claim 1, wherein the opening angle of the VIGV is kept at an opening angle larger than or equal to the opening angle of the VIGV at the time when an emergency shutdown signal was received until a speed of the gas turbine is reduced to a speed limit for closing the VIGV.

10. The method for operating a gas turbine power plant according to claim 1, wherein a cooling air re-cooler is switched off when the emergency shutdown is initiated.

11. A gas turbine power plant, comprising:
a gas turbine;
a HRSG following the gas turbine;
an exhaust gas blower;
a carbon dioxide separation plant configured to separate the carbon dioxide contained in exhaust gases from the gas turbine, HRSG and exhaust gas blower and discharge separated carbon dioxide to a carbon dioxide outlet, the gas turbine, HRSG, exhaust gas blower, carbon dioxide separation plant being connected by exhaust gas lines; and
a controller configured to control the opening angle of a VIGV at a position larger than or equal to a position configured to keep a pressure in the exhaust gas lines between the HRSG and the exhaust gas blower above a minimum required pressure during a trip of the gas turbine power plant to prevent hazardous pressure differences between the exhaust gas side of the HRSG and ambient air.

12. A gas turbine power plant according to claim 11 comprising:
at least one of a HRSG exit pressure sensor and an exhaust gas blower inlet pressure sensor.

13. A gas turbine power plant according to claim 12 wherein the controller is configured to open the VIGV as a function of at least one of a pressure measured by the HRSG exit pressure sensor and a pressure measured by the exhaust gas blower inlet pressure sensor.

* * * * *